United States Patent
Xu et al.

(10) Patent No.: US 7,791,321 B2
(45) Date of Patent: Sep. 7, 2010

(54) COUPLED-INDUCTOR MULTI-PHASE BUCK CONVERTERS

(75) Inventors: Ming Xu, Blacksburg, VA (US); Fred C. Lee, Blacksburg, VA (US); Yucheng Ying, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 227 days.

(21) Appl. No.: 11/678,356

(22) Filed: Feb. 23, 2007

(65) Prior Publication Data

US 2008/0205098 A1      Aug. 28, 2008

(51) Int. Cl.
G05F 1/59 (2006.01)
(52) U.S. Cl. .................. 323/272; 323/262; 323/361
(58) Field of Classification Search .................. 323/272, 323/282, 222, 290, 345, 355, 361, 257, 259, 323/262; 363/45–48, 65, 69–70
See application file for complete search history.

(56) References Cited

U.S. PATENT DOCUMENTS

| | | | | |
|---|---|---|---|---|
| 3,984,799 A | * | 10/1976 | Fletcher et al. | 363/21.08 |
| 4,024,451 A | * | 5/1977 | Nishino et al. | 363/25 |
| 4,384,321 A | * | 5/1983 | Rippel | 363/124 |
| 6,153,453 A | * | 11/2000 | Jimenez | 438/200 |
| 6,696,823 B2 | * | 2/2004 | Ledenev et al. | 323/272 |
| 7,138,787 B2 | * | 11/2006 | Tsuruya | 323/225 |
| 7,183,754 B2 | * | 2/2007 | Tsuruya | 323/272 |

* cited by examiner

*Primary Examiner*—Harry Behm
(74) *Attorney, Agent, or Firm*—Whitham, Curtis, Christofferson & Cook, P.C.

(57) ABSTRACT

In a multi-phase power converter, efficiency is increased and ripple reduced while maintaining transient response and dynamic performance improved by electrically coupling secondary windings of transformers or provided for inductors of respective phases such that current to a load is induced in each phase by current in another phase. Magnetic coupling can also be provided between phases using a multi-aperture core of a configuration which minimizes primary winding length and copper losses. Efficiency at light load is enhanced by controlling current in the series connection of secondary windings in either binary or analog fashion.

12 Claims, 8 Drawing Sheets

2-Phase Buck

*3-Phase Buck*

*2-Phase Buck*

3-Phase Buck

2-Phase Buck

COUPLED-INDUCTOR MULTI-PHASE BUCK CONVERTERS

BACKGROUND OF THE INVENTION

1. Field of the Invention

The present invention generally relates to voltage regulators (VRs) and voltage regulator modules (VRMs) and, more particularly, to switching VRs and VRMs having broad bandwidth to accommodate requirements for rapid transient response and with low steady-state current ripple such as are increasingly demanded for powering current and foreseeable microprocessors and the like.

2. Description of the Prior Art

Most electronic devices are ultimately powered with a direct current (DC) voltage even though power is often initially obtained from an alternating current (AC) power distribution system. Many such devices also require close voltage regulation of the power supply to function properly and reliably even when power is provided from a DC voltage source such as batteries. Microprocessors and other digital processing circuits using integrated circuits with high speed clocks and/or of high integration density require particularly close regulation of voltage since high integration density has required reduction of size of increased numbers of closely spaced integrated circuit elements which has, in turn, required operation at lower voltages.

Operation at lower voltages also implies operation at higher currents. State-of-the-art microprocessor designs nominally operate at 0.8 V and 150 A or more and foreseeable designs will operate at even lower voltages and higher currents. Such devices also generally operate in several modes such as an operating mode and one or more stand-by and/or sleep states in order to save overall power consumption which implies extremely wide and rapid swings in current requirements which must be supplied with high efficiency and, generally, high current density and low cost of the voltage regulator module (VRM), as well.

To provide acceptably increased efficiency, a combination of switching and filtering is generally preferred. In such arrangements, duty cycle of high speed switching is controlled to regulate voltage while accommodating changing current requirements of a load. A high rate of change of current requirements of a load requires a wide control bandwidth which, as a practical matter is generally limited to about one-sixth of the switching frequency. VRs currently in use are commonly designed to operate at a 300 KHz switching frequency and have a typical control bandwidth of about 50 KHz. While increasing control bandwidth can, in theory, be accomplished by increasing switching frequency, as a practical matter, increasing either or both of the switching frequency or the control bandwidth is a difficult technical challenge for several reasons such as developing sufficiently high voltage regulation resolution within a short switching cycle and accommodation of voltage sampling constraints for control through feedback (which imposes the limit of about one-sixth of the switching frequency on the control bandwidth due to sample-and-hold circuit effects, particularly if adaptive voltage positioning (AVP) is required, as well as increased losses due to, for example, body diode conductance of switches. Meeting transient load requirements for current and foreseeable microprocessor design require filter storage capacitance of 30 capacitors of 100 µF each or eight capacitors of 560 µF each which is prohibitive and unacceptable in terms of both cost and footprint.

The practical limit on control bandwidth of one-sixth of the switching frequency can be overcome by coupling the two (or more) output inductors of a multi-phase power converter of the buck converter type which also can reduce the steady-state current ripple while maintaining the same transient response which also reduces conduction losses in the switches. In such an arrangement, provision of an air gap in the center leg of the coupled inductor core distributes the magnetic flux more evenly and can reduce the core losses in the center leg. A commercial coupling inductor structure has been developed based on this concept, as depicted in FIG. 1A.

However, the known commercial coupling structure has the disadvantage that, in order to make the inverse coupling between phases, the windings must be around the core legs. Further, the winding length must be greater than in the non-coupled inductor and one more copper trace is needed in the layout to connect to the switching node as shown in FIG. 1B, increasing copper losses due to the longer trace. Additionally, the core of the known commercial coupling inductor is not flexible or physically symmetrical to match the preferred power stage layout and the voltage regulator arrangement in preferred layouts for a motherboard of current processor designs. These unavoidable physical constraints cause severely unbalanced ripple currents of each phase, as shown in FIG. 2 for a four phase embodiment.

It has also been proposed to couple all phases through multiple two-phase coupled inductors or transformers. However, this approach is very complex and requires a large number of magnetic components to be provided at a high cost and thus is unacceptable.

SUMMARY OF THE INVENTION

It is therefore an object of the present invention to provide a coupled inductor for multi-phase buck converters of improved physical symmetry and having a layout which is compatible with preferred voltage regulator and motherboard layouts and which avoids the necessity of increasing winding length.

In order to accomplish these and other objects of the invention, a multi-phase power converter is provided including a plurality of switched power converter circuits connected in parallel and including an inductor, a plurality of secondary windings, each said secondary winding being magnetically coupled to a corresponding inductor, and a serial connection of the secondary windings such that voltage in each inductor due to currents in respective ones of the secondary windings is of the same polarity.

In accordance with another aspect of the invention, a method of reducing ripple in a multi-phase power converter is provided comprising steps of connecting an inductor in each phase of a multi-phase power converter, magnetically coupling each such inductor to a secondary winding, and electrically coupling the inductors by connecting each secondary winding in series such that voltage in each inductor due to currents in respective ones of the secondary windings is of the same polarity.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 3B:
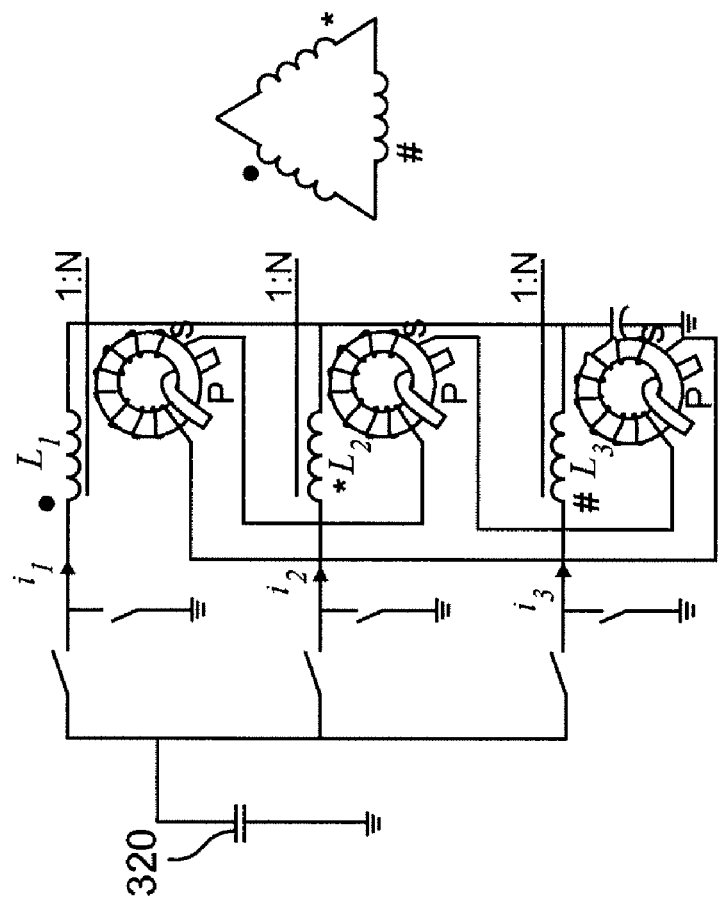
Figure 3A:
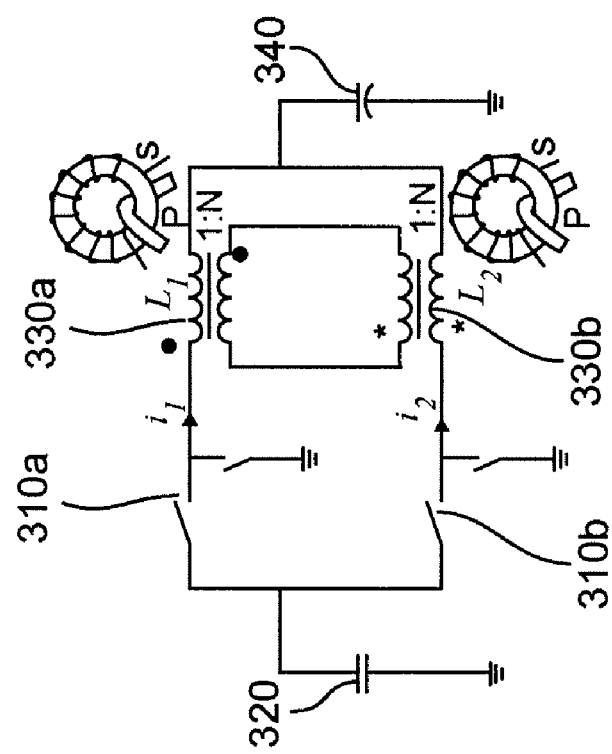
Figure 5A:
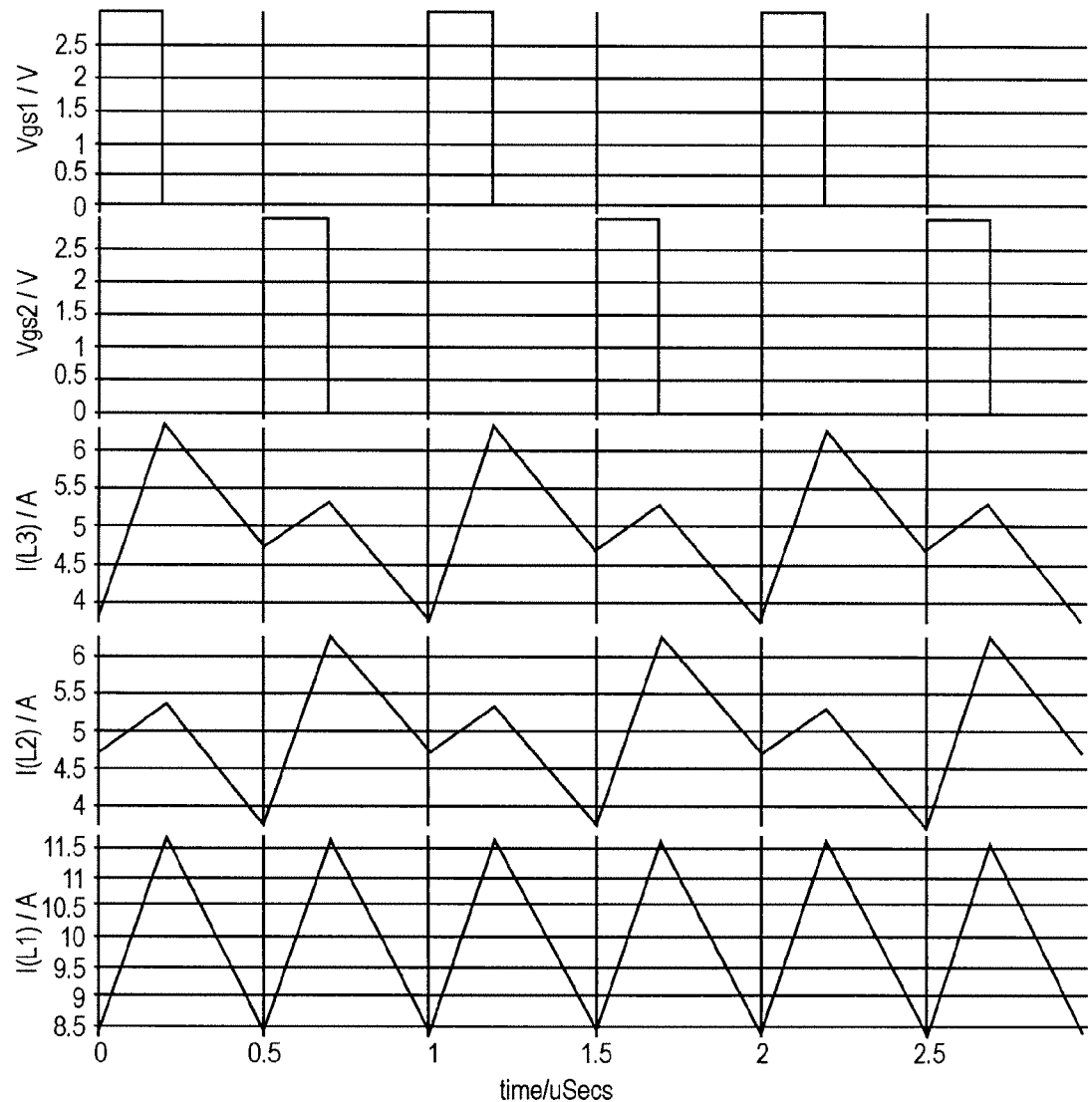
FIGS. 5A and 5B illustrate simulated phase current waveforms of the circuitries of FIGS. 3A-4B of two and three phases, respectively.
Figure 5B:
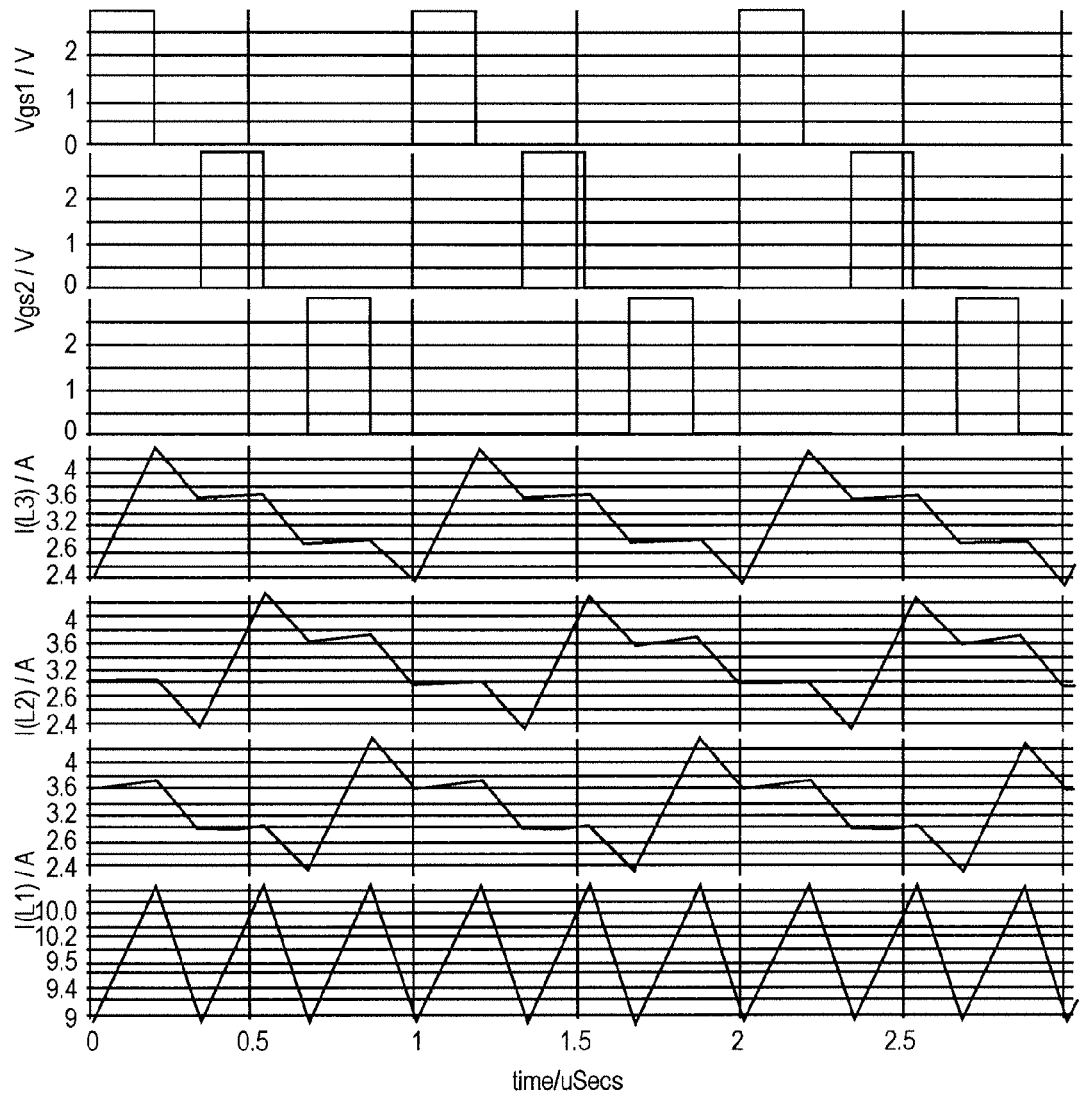

Referring now to the drawings, and more particularly to FIG. 3A, there is shown a schematic diagram of a two-phase buck converter including a coupled inductor in accordance with the invention. Those skilled in the art will immediately recognize that the circuit of FIG. 3A is essentially two single-phase buck converters connected in parallel but with secondary windings on the respective inductors therein (e.g. forming transformers, preferably on cores, as depicted, with the primary and secondary windings indicated by "P" and "s", respectively) which are connected in an opposing relationship as indicated by the symbols "●" and "*". The basic operation of the buck converters without such connected secondary windings is that the switching arrangements 310a and 310b, each including so-called top and bottom switches, connect a power source 320 to the inductors 330a and 330b for short intervals of time through respective top switches in an alternating manner between the respective buck converters as shown in the upper two traces of the left side of FIG. 5 while, during periods the power source is not connected to a respective inductor, providing a "freewheel" current path for the inductor through a respective bottom switch. Thus the voltage across the inductor "bucks" the voltage of the power source while the power source is connected to the inductor and the current through the inductor is increasing and provides a voltage which provides additional current to storage/filter capacitor 340 during periods in which the power source is disconnected and the inductor current is decreasing.

The oppositional coupling of the secondary windings illustrated in FIG. 3A couples the two phases in a way that causes a voltage in the buck converter of the opposite phase which is of the same polarity and also drives current to the storage/filter capacitor 340 similar to but proportionately less than (due to leakage inductance) current in the phase connected to power source 320 during periods of such connection. (The number of secondary turns on each core may be made as large as desired or practical to reduce the secondary winding loss.) The voltage developed during the freewheel periods when both buck converters are disconnected from the power source are very similar and decrease at about the same rate, as shown in the third an fourth waveforms of FIG. 5A; the sum of which is shown in the fifth waveform of FIG. 5A which is a very regular and consistent triangular ripple waveform (of a frequency twice that of the switching frequency) since the third and fourth waveforms are substantially identical but for phase.

In essence, the electrical coupling between the secondary windings provides additional current to filter/storage capacitor 340 beyond that which would be delivered by both buck converters in the absence of such coupling; thus increasing freewheel current and correspondingly reducing ripple. Thus it can be easily appreciated that efficiency of the two-phase buck converter can be significantly improved by use of the coupling arrangement between phases in accordance with the invention. Responsiveness to transient changes in current load is also improved since changes in duty cycle in one phase will be followed in the other; thus developing improved transient response and an effective increase in control bandwidth without increase of switching frequency.

Figure 4B:
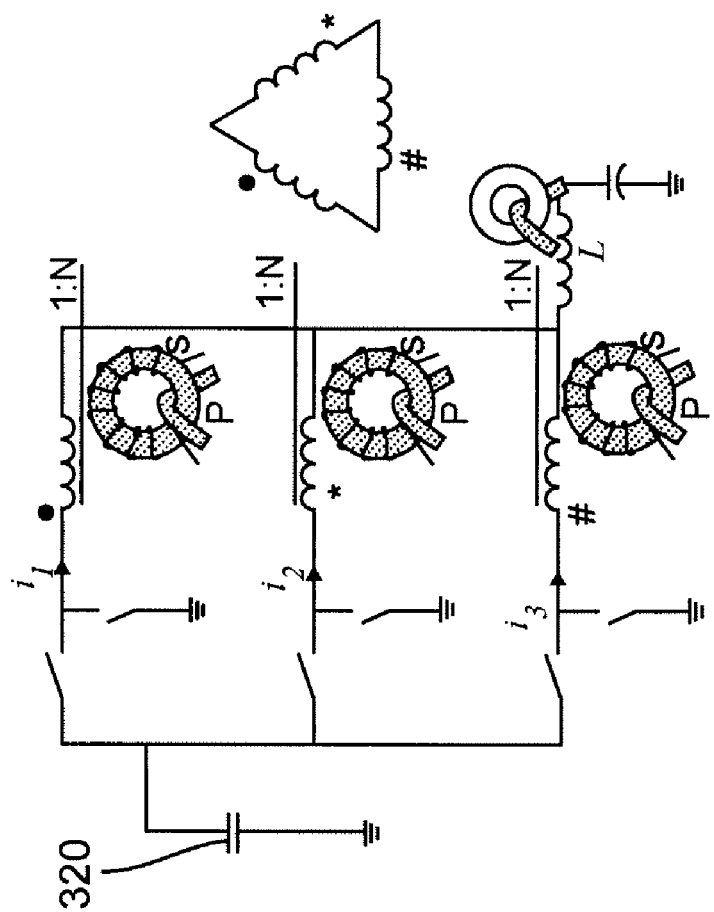
Figure 4A:
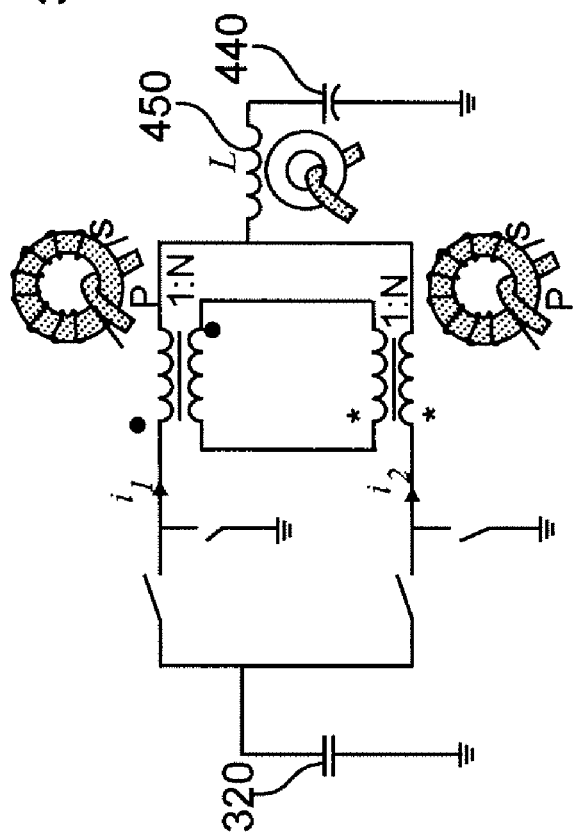

It should be appreciated that the coupling described above in connection with FIG. 3A need not involve the inductor principally providing the voltage bucking function but can be provided in other ways such as by using transformers with a separate output inductor as shown in FIG. 4A. In this case, the operation of the circuit is identical to that described above with the fifth waveform of FIG. 5A being applied to the inductor 450 rather than to the filter/storage capacitor 340 of FIG. 3A. The voltage bucking function will thus be applied to the substantially triangular waveform which will thus be substantially smoothed as applied to filter/storage capacitor 440. Again, the transient response and effective control bandwidth are improved without increase of switching frequency.

Figure 7:
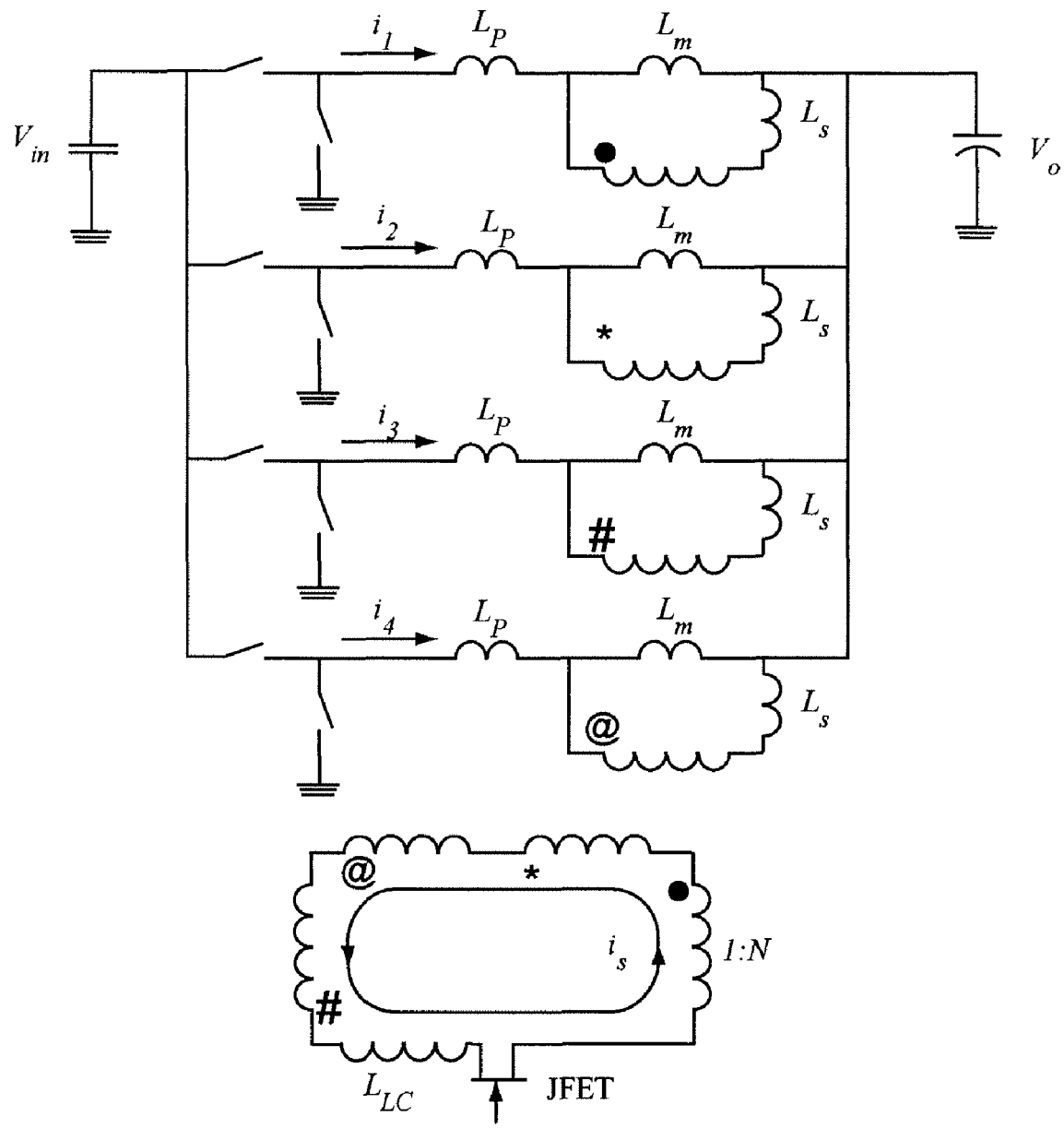
FIG. 7 is a schematic diagram of a four-phase embodiment of the invention including an additional perfecting feature for further increasing efficiency of the invention for light loads.

The basic principles of the invention discussed above in connection with FIGS. 3A and 4A may be easily applied to any number of phases as shown for three phases in FIGS. 3B and 4B and for four phases in FIG. 7. In the case of more than two phases (three phases being indicated by "●", "*" and "#", respectively, in FIGS. 3B and 4B and, in FIG. 7, a fourth phase being indicated by "@"), the secondary windings of each phase are simply connected in series such that the voltages in the inductors of the respective phases are of the same polarity to provide current to the filter/storage capacitor or output as schematically depicted on the right side of each of FIGS. 3B and 4B (which is also true for two-phase embodiments described above). It will be noted from the third to sixth waveforms of FIG. 5B that when any given phase is connected to power source 320, the current rises at least slightly in each of the other phases rather than simply declining as freewheel current declines in the absence of such a connection or coupling and, while the freewheel current declines during other periods, freewheel current is simultaneously and concurrently delivered from all of the phases which sum to a substantially triangular ripple as discussed above in regard to FIGS. 3A and 4A.

Figure 1B:
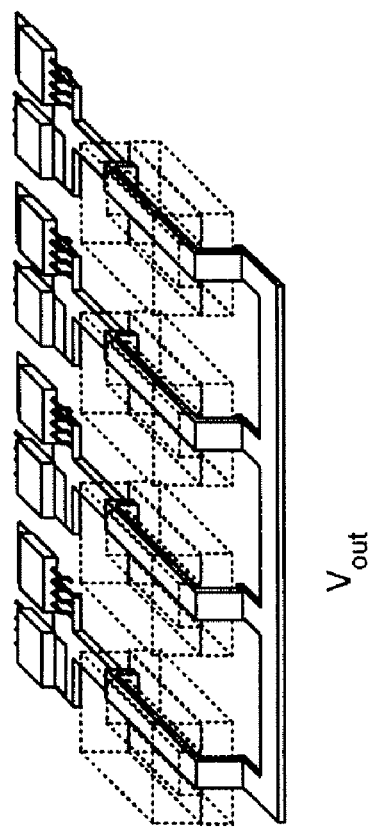
FIGS. 1A and 1B are isometric views showing a winding length comparison between a known commercial coupled inductor structure and a non-coupled inductor structure, both of four phases, respectively.
Figure 1A:
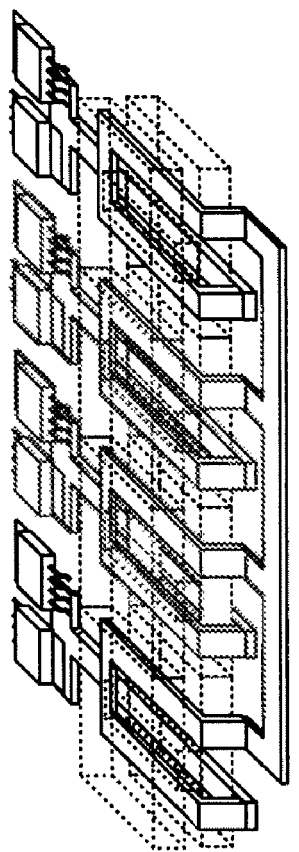
Figure 2:
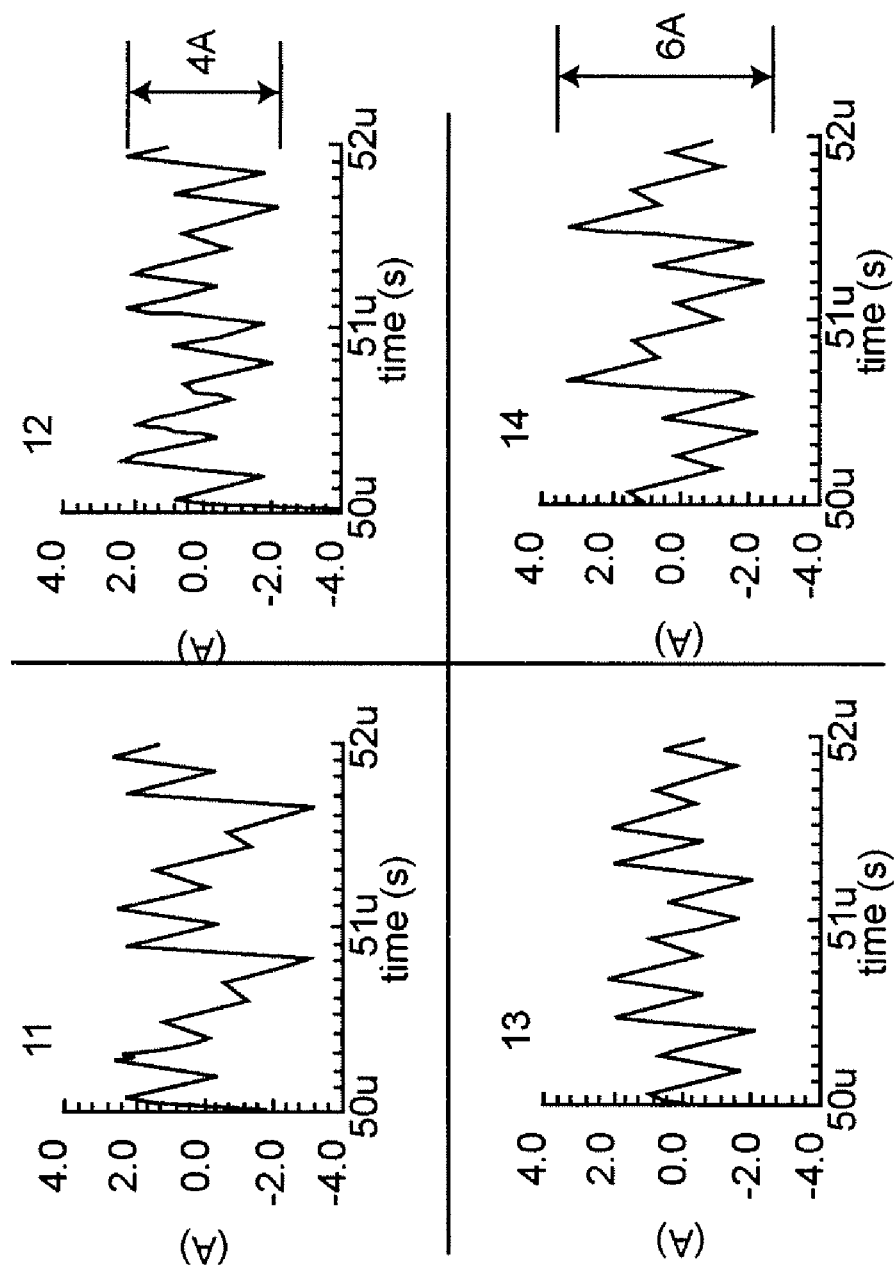
FIG. 2 shows the unbalanced current ripple of the four phase coupled inductor of FIG. 1A, FIGS. 3A and 3B schematically illustrate circuits including coupled inductor buck converters in accordance with the invention of two and multiple (e.g. three or more) phases, respectively, FIGS. 4A and 4B schematically illustrate circuits including coupled inductor buck converters in accordance with the invention using transformers and output inductor of two and multiple phases respectively.
Figure 6A:
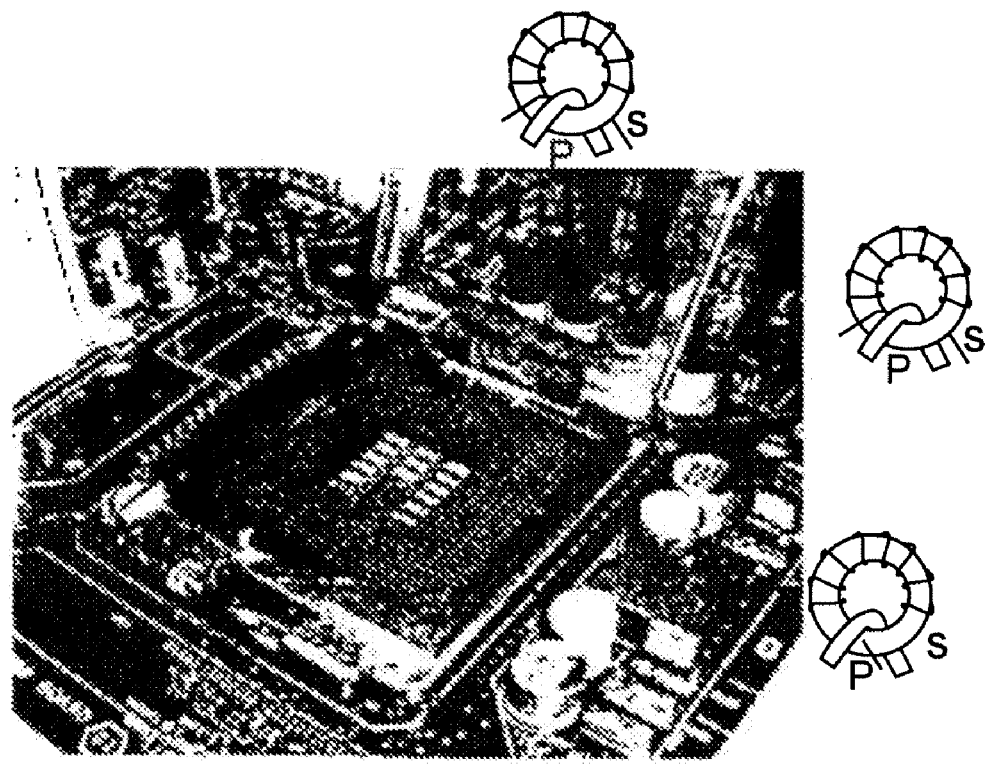
FIGS. 6A and 6B are isometric views of coupled inductor voltage converters/regulators in accordance with the invention without and with magnetic coupling, respectively.

It should also be noted that FIGS. 3A and 4A depict the inductors and secondary windings as being formed on individual cores and that the secondary windings are omitted from the basic schematic circuit diagrams of FIGS. 3B and 4B but similarly depicted on cores with their serial connection for clarity. These separate cores need not be magnetically coupled and electrical coupling is sufficient for the successful practice of the invention in accordance with its basic principles. Additionally, use of separate cores increases the number of parts (also carrying a cost penalty for manufacture) and may not use space efficiently; possibly reducing the power density which can be achieved. However, using discrete and separate cores may be desirable and efficient for some applications and do not necessarily imply a reduction in efficiency or power density but provide substantial layout flexibility compared to known magnetically coupled arrangements such as that of FIG. 1A. An embodiment of the invention for three phases using discrete cores is shown in FIG. 6A.

Figure 6B:
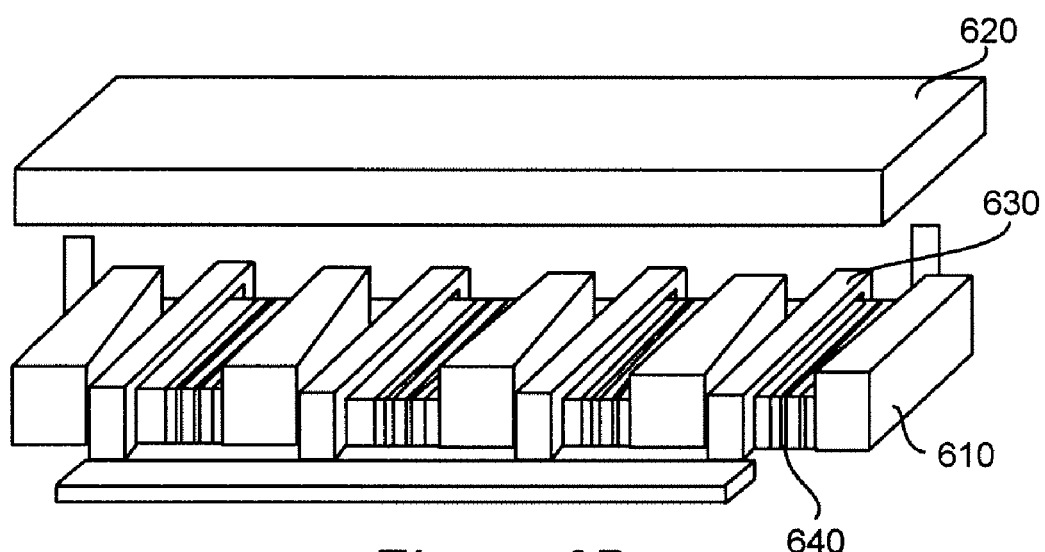

Nevertheless, for other applications, it is preferred to provide, as a perfecting feature not required for successful practice of the invention, such coupling between phases in a single structure in which magnetic coupling between phases can also be achieved while avoiding the problems discussed above for the known commercial structure of FIG. 1A (e.g. avoiding extended length of windings and asymmetrical and unbalanced response among phases while being flexible in spatial layout to accommodate preferred designs of motherboards and the like). An exemplary structure having such qualities is illustrated in FIG. 6B. This structure is preferably formed on a core having two mating parts which are assembled into a structure which is essentially a multi aperture core with an aperture for each phase such as a structure 610 of magnetically permeable material with raised portions forming legs which separate the apertures with the apertures being completed by another element 620 of magnetically permeable material which may be assembled therewith. Such a two-part structure also greatly facilitates the formation of primary (630) and secondary (640) windings on one or both of the elements 610, 620 prior to assembly. Such a structure has much improved magnetic and electrical symmetry as compared with the structure of FIG. 1A since the magnetic circuit is closed and the secondary windings are distributed and tend to equalize the distribution of magnetic flux in the assembled core even when the multi-aperture core is arranged in a linear configuration as shown. Other configurations are possible and may provide marginal improvements in electrical and magnetic symmetry but may be less readily accommodated in a VRM or by a motherboard or the like.

Referring now to FIG. 7, a further perfecting feature of the invention which is not necessary to its successful practice in accordance with the basic principles of the invention will now be explained. It has been found that a conventional coupled inductor buck converter such as that discussed above in connection with FIG. 1A will have lower light load efficiency than the non-coupled buck converter since the coupling will cause the bottom switch of each phase to conduct current induced by the other phases and it is well-recognized that losses in the bottom switch, particularly the body diode conduction of the bottom switch, are principal sources of inefficiency in a buck converter topology. Furthermore, it has been found that higher light load efficiencies can be achieved with larger inductor values in discontinuous conduction mode (DCM) buck converters (having zero inductor current for certain times in each switching cycle).

Considering that the self-inductance, $L_s$, of each inductor is much larger than its steady-state inductance (as is depicted by the illustration of inductors in the respective phases of FIG. 7), the efficiency of a coupled buck converter in accordance with any of the above described embodiments of the invention can be improved by decoupling the phases or reducing the coupling of the phases (e.g. essentially reducing or eliminating the magnitude of freewheel current induced by other phases) during periods of light load. Such a function can be implemented in a number of ways such as including a bi-directional switch such as a JFET in the secondary side loop as illustrated in FIG. 7. At heavy loads, the switch is conductive and the circuit operates as described above and will provide rapid transient response due to the small transient inductance. At lighter loads, the current in the secondary loop can be reduced or eliminated by suitable control of the JFET and, as the decoupling is increased, the self-inductance of the inductor in each phase becomes dominant over the steady-state inductance and thus substantially increases efficiency at light load. It should be appreciated that the bi-directional switch can be operated in a binary manner (e.g. either on or off) or may be used in an analog fashion to increase impedance and reduce coupling with load current to match coupling more or less closely to load current whereby efficiency can be held to near optimum values. It should also be appreciated that an additional inductor LLC (depicted with dashed/phantom lines) can be provided in series in the secondary circuit to adjust the equivalent leakage inductance, if desired.

In view of the foregoing, it is seen that providing coupling between phases of a multi-phase buck converter voltage regulator provides improved effective control bandwidth and transient response without a requirement for increased switching frequency and the inefficiencies generally associated therewith. The invention can be implemented using discrete cores and electrical coupling or the coupling can be a combination of electrical and magnetic effects; the latter being achieved with improved symmetry and reduced imbalance of current ripple using the perfecting feature of the invention described above than has heretofore been achievable. The principles of the invention are also fully applicable to other converter topologies such as a boost converter.

While the invention has been described in terms of a single preferred embodiment, those skilled in the art will recognize that the invention can be practiced with modification within the spirit and scope of the appended claims.

The invention claimed is:

1. A multi-phase power converter including
   a plurality of switched power converter circuits connected in parallel, each said power converter circuit including an inductor and a switch arrangement for producing, from a power source, a current in said inductor of each respective switched power converter circuit which increases and decreases as said inductor stores or releases energy, respectively,
   a plurality of secondary windings, each said secondary winding being magnetically coupled to a corresponding said inductor of a respective said switched power converter circuit, and
   a serial connection of said secondary windings in a loop such that a voltage is produced in each respective said inductor due to currents in respective ones of said secondary windings when said increasing and decreasing current is present in any said inductor and is of the same polarity in each said inductor.

2. The multi-phase power converter as recited in claim 1 wherein each of said plurality of switched power converter circuits has a buck converter topology.

3. The multi-phase power converter as recited in claim 2, further including an inductor common to all of said plurality of switched power converter circuits.

4. The multi-phase power converter as recited in claim 1 wherein each of said plurality of switched power converter circuits is a buck converter.

5. The multi-phase power converter as recited in claim 1 further including means for magnetically coupling said inductors of said plurality of switched power converter circuits and said secondary windings of a common multi-aperture core.

6. The power converter circuit as recited in claim 1, further including a bi-directional switch in said serial connection of said secondary windings to adjust efficiency of said power converter circuit at light load.

7. The power converter as recited in claim 6, wherein said bi-directional switch comprises a JFET.

8. The power converter as recited in claim 6, further including an inductor in said serial connection of said secondary windings to adjust effective leakage inductance.

9. A method of reducing ripple in a multi-phase power converter comprising steps of
intermittently connecting an inductor in each phase of said multi-phase power converter to a power source to produce a current in said inductor which increases and decreases that stores and releases energy from said inductor, respectively, in each said phase of said multi-phase power converter circuit
magnetically coupling each said inductor to a secondary winding, and
electrically coupling said inductors by connecting each said secondary winding in series in a loop such that a voltage is produced in each said inductor due to currents in respective ones of said secondary windings when said increasing or decreasing current is present in any said inductor and is of the same polarity in each said inductor.

10. A method as recited in claim 9 including the further step of magnetically coupling said inductors and said secondary windings.

11. A method as recited in claim 9, including a further step of adjusting equivalent leakage inductance.

12. A method as recited in claim 9, including a further step of controlling current for said step of electrically coupling said secondary windings.

\* \* \* \* \*